J. W. A. McKILLICAN.
POWER TRANSMITTING DEVICE.
APPLICATION FILED OCT. 15, 1918.

1,312,999.

Patented Aug. 12, 1919.

Inventor
James W. A. McKillican
By
Fetherstonhaugh Co
Attorneys

UNITED STATES PATENT OFFICE.

JAMES W. A. McKILLICAN, OF MONTREAL, QUEBEC, CANADA.

POWER-TRANSMITTING DEVICE.

1,312,999.  Specification of Letters Patent.  Patented Aug. 12, 1919.

Application filed October 15, 1918. Serial No. 258,212.

*To all whom it may concern:*

Be it known that I, JAMES W. A. McKIL-LICAN, a subject of the King of Great Britain, and resident of the city of Montreal, in the Province of Quebec and Dominion of Canada, have invented certain new and useful Improvements in Power-Transmitting Devices, of which the following is a full, clear, and exact description.

This invention relates to a device for transforming reciprocating motion of one member into rotary motion of another member, such as a shaft, spindle, piston rod or the like, and the main object of the invention is to provide a simple, efficient clutch device adapted to reciprocate upon a helically grooved shaft to transmit rotary motion continuously thereto in one direction, regardless of the direction of movement of the clutch device.

In the drawings which illustrate the invention;—

Figure 1:
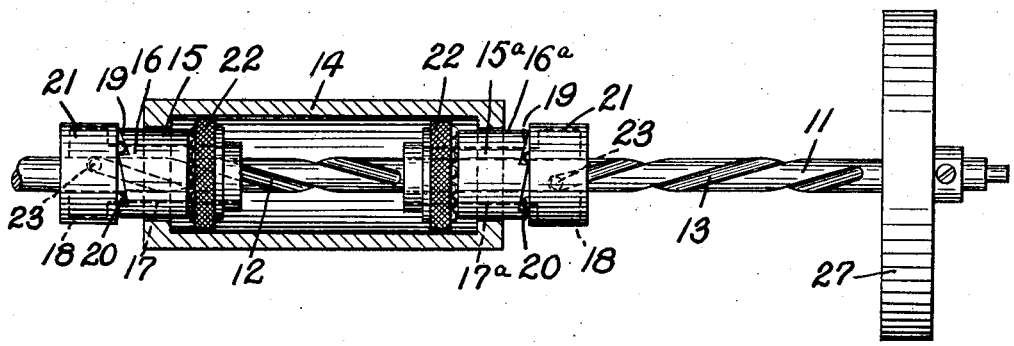
Figure 1 is a side elevation of the device showing the driving casing in section.
Figure 2:
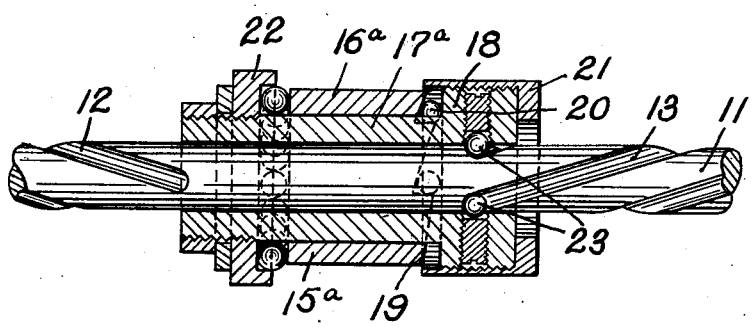
Fig. 2 is a longitudinal sectional view through one of the clutches.
Figure 3:
Fig. 3 is a view of the grooved shaft showing a slightly modified form.

According to my invention, I employ a shaft, spindle or the like having helical grooves of right and left hand pitch. The right hand groove at one end may extend to a point at or near the center, where it approaches the left hand groove on the opposite end, as shown in Figs. 1 and 2, or the grooves may each be continuous on opposite sides of the shaft center and intersecting, as shown in Fig. 3. Such grooved shafts, which I designate by the numeral 11 with helical grooves 12 and 13, are of common construction.

The driving member or means for rotating the shaft comprises a casing 14 within the ends of which clutches 15 and 15$^a$ are mounted. These clutches comprise outer sleeves 16 and 16$^a$, rigidly connected to the casing, and inner sleeves 17 and 17$^a$, which are revoluble in the outer sleeves and are in turn slidably and revolubly mounted on the shaft 11. The remote ends of these inner sleeves are provided with outwardly projecting flanges 18 and the remote ends of the outer sleeves are formed with ratchet teeth 19 facing the flanges, the teeth of one clutch having right hand pitch and the teeth of the other clutch having left hand pitch. Balls 20 are mounted between the sleeves 16 and 16$^a$ and the flanges, there being one ball for each tooth. These balls are retained by collars 21 suitably secured to the flanges. At the adjacent ends of the inner sleeves, ball thrust bearings 22 are provided against which the adjacent ends of the outer sleeves bear. Driving connection between the inner sleeves and the shaft is effected by any suitable means, such as the balls 23 mounted partly in the sleeves and partly in the grooves 12 and 13 of the shaft.

Figure 4:
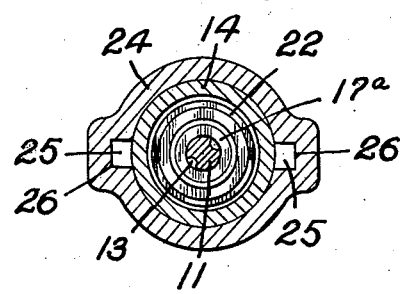
Fig. 4 is a cross sectional view illustrating the arrangement of the device for driving by steam or similar means.

When the device is used as a tool, such as a drill or the like, the casing 14 forms a hand grip by which the necessary power is applied. When the device forms part of a prime mover, such as an engine, the casing acts as a piston and is inclosed in a cylinder 24 shown in Fig. 4, any suitable means being provided to prevent it rotating in the cylinder, such as projections 25 engaging longitudinal grooves 26 in the cylinder. A balance or fly wheel 27 may be provided if desired.

The operation of the device is as follows;—

Force is applied to the casing in the axial direction of the shaft so as to reciprocate the casing and attached parts. During movement of the casing toward the wheel 27, the outer sleeve 16$^a$ is forced toward the flange 18 and carries the sleeve with it, so that the balls 23 in the sleeve cause rotation of the shaft. This rotation of the shaft tends to rotate the inner sleeve in the opposite direction but such rotation is prevented by the balls 20, which jam between the flange 18 and the sloping faces of the teeth 19 of the clutch 15$^a$, so that the sleeve is held against rotation. The sleeve 16 is simultaneously shifted along the shaft by the casing and draws the sleeve 17 with it, the balls 23 therein engaging the shaft grooves and causing the inner sleeve to rotate within the outer sleeve. The rotation of the inner sleeve carries the balls 19 to the roots of the clutch teeth and against the abrupt faces of the teeth, so that the balls do not jam between the flange 18 and the teeth 19 and thus leave the inner sleeve free to rotate within the outer sleeve. When the direction of the casing movement is reversed, the action of the clutches is reversed, so that the clutch 15 drives and the clutch 15ª is idle. Owing to the opposite pitch of the grooves 12 and 13, the reciprocating motion of the casing is transformed into rotary motion in one direction only.

When the device is properly adjusted so that there is no free play, one clutch takes hold as the other lets go at the instant that the casing movement reverses, so that the application of power to the shaft is practically continuous. It will further be seen that the application of power is uniform throughout each revolution of the shaft and not of varying degree as, for example, in an ordinary steam engine.

Having thus described my invention, what I claim is:—

1. A device of the character described, comprising a shaft having oppositely pitched helical grooves thereon, a pair of clutches slidably and revolubly mounted on the shaft each comprising an inner sleeve, means carried thereby engaging one of the shaft grooves, an outer sleeve, means for releasably connecting the inner and outer sleeves comprising a flange on each inner sleeve, ratchet teeth on the outer sleeves facing said flanges, and balls seated between said teeth and flanges adapted to jam between the teeth and flanges upon relatively opposite revolution of the inner and outer sleeves and to lock the inner sleeve against revolution independently of the outer sleeve in one direction, and a casing rigidly connected to both outer sleeves.

2. A device according to claim 1, in which the teeth of one clutch are pitched oppositely to the teeth of the other clutch.

In witness whereof, I have hereunto set my hand.

JAMES W. A. McKILLICAN.

Copies of this patent may be obtained for five cents each, by addressing the "Commissioner of Patents, Washington, D. C."